United States Patent [19]
Brownlee

[11] 3,871,700
[45] Mar. 18, 1975

[54] ADD ON ENCLOSURE FOR CAMPERS AND TRAILERS

[76] Inventor: Merrel F. Brownlee, 58 Euclid Ave., Struthers, Ohio 44471

[22] Filed: Sept. 26, 1973

[21] Appl. No.: 401,123

[52] U.S. Cl................... 296/26, 135/1 A, 160/330, 296/23 R
[51] Int. Cl. .............................................. B62c 1/06
[58] Field of Search............ 296/26, 23 R, 23 D, 25; 160/330; 280/150 R; 135/1 A, 5 A

[56] References Cited
UNITED STATES PATENTS

| 1,462,279 | 7/1923 | Guinzburg | 160/330 |
| 2,188,545 | 10/1937 | Smelker | 296/26 |
| 2,225,993 | 12/1940 | Hornberger | 296/23 R |
| 2,246,813 | 6/1941 | Preston | 296/26 |
| 3,106,411 | 1/1962 | Holmes | 280/150 R |
| 3,774,957 | 11/1973 | Basaraba | 296/26 |

Primary Examiner—Albert J. Makay
Assistant Examiner—Gary Auton
Attorney, Agent, or Firm—Webster B. Harpman

[57] ABSTRACT

An add on enclosure for campers and trailers attachable to trailers in the area sometimes occupied by the towing vehicle or existing under fold-out portions thereof as in a camper includes side walls and a floor and is provided with an access opening and a movable closure therefore.

2 Claims, 3 Drawing Figures

PATENTED MAR 18 1975 3,871,700

ADD ON ENCLOSURE FOR CAMPERS AND TRAILERS

BACKGROUND OF THE INVENTION

1. Field of the Invention

This invention relates to campers or trailers and more particularly to enclosures for areas existing under overhanging portions thereof.

2. Description of the Prior Art

No prior art is known whereby the areas of a trailer sometimes occupied by the towing vehicle may be enclosed and used when the towing vehicle is not present. No prior art is known wherein the areas existing beneath the fold-out portions of a camper may be enclosed so as to form weatherproof storage areas or the like.

This invention provides enclosures for such areas on campers and trailers and enables various items used about a camp site or in connection with the trailer or camper to be enclosed thereby.

SUMMARY OF THE INVENTION

An add on enclosure for campers and trailers includes a preferably flexible fabric wall section attachable by fasteners to overhanging portions of campers or trailers so as to depend therefrom and enclose the areas therebeneath. Floor cloths are preferably provided and tie down means is used to secure the enclosures in tensioned, attractive appearance so as to form in effect extensions of the trailer or camper to which they are attached. Access openings which may be tent-like slits with slide fastener closures employed to permit ready access to the area enclosed by the add on enclosure.

DESCRIPTION OF THE PREFERRED EMBODIMENT

Figure 1:
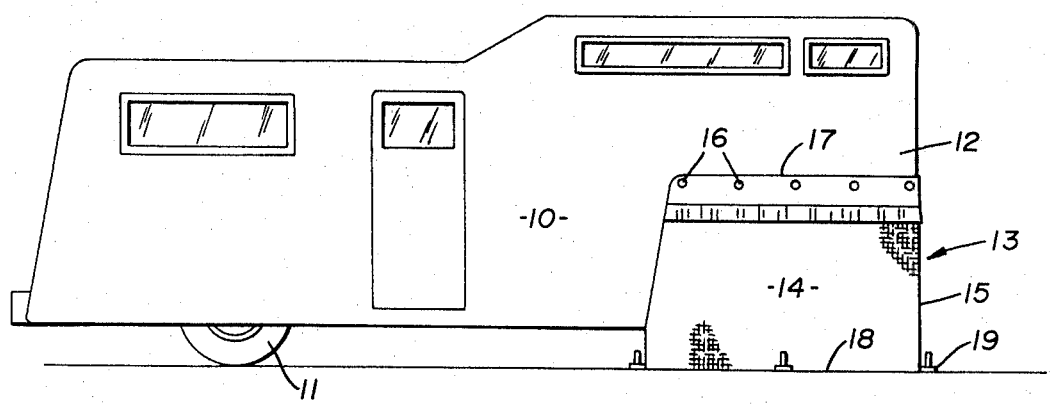
FIG. 1 is a side elevation of a trailer showing an add on enclosure attached thereto.

In the form of the invention chosen for illustration and description herein the add on enclosure for campers and trailers is illustrated in connection with a trailer 10 having ground engaging wheels 11 and a forwardly extending portion 12 which overlies a towing vehicle when the trailer 10 is moved thereby. The area beneath the forwardly extending portion 12 of the trailer 10 is provided with an add on enclosure generally indicated at 13 and including spaced side walls 14 and an end wall 15. A plurality of fasteners 16 positioned on the lower edge of the forwardly extending portion 12 of the trailer 10 are engaged on matching portions thereof formed in an upper edge 17 of the side walls 14 and end wall 15 of the add on enclosure. The lower edges 18 of the side walls 14 and end wall 15 are provided with extending tabs 19 through which stakes or other fasteners may be positioned so as to secure the add on enclosure 13 in fixed position relative to the ground or other supporting surface.

Figure 2:
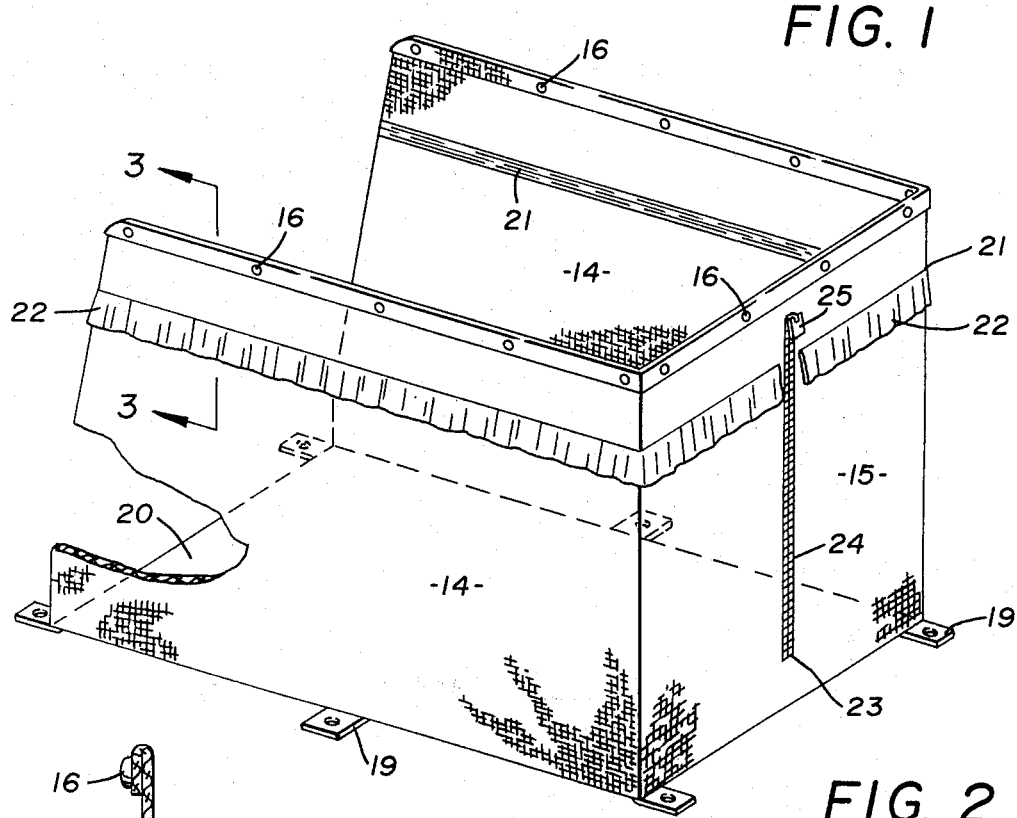
FIG. 2 is a perspective view with parts broken away showing the add on enclosure of FIG. 1.

By referring to FIG. 2 of the drawings in particular it will be seen that a ground cloth 20 is positioned between the side walls 14 and end wall 15 of the add on enclosure and it will occur to those skilled in the art that the end portion thereof opposite the end wall 15 may be extended vertically to form a closure with respect to the bottom of the trailer 10 as seen for example in FIG. 1 of the drawings.

Still referring to FIG. 2 of the drawings, it will be seen that the add on enclosure for campers and trailers is preferably formed of a waterproof flexible fabric material and that it incorporates an elastic section 21 covered by a waterproof flexible flange 22 so that the add on enclosure for campers and trailers will remain tightly stretched at all times. Access to the area enclosed by the add on enclosure may be had by a vertical slit 23 normally closed by a continuous slide fastener 24 having an actuating tab 25 as will be understood by those skilled in the art.

The slit 23 and slide fastener 24 are shown in a vertical configuration in FIG. 2 of the drawings and it will occur to those skilled in the art that the configuration may be altered so that a different shaped opening in one of the walls of the add on enclosure may be formed thereby.

Figure 3:
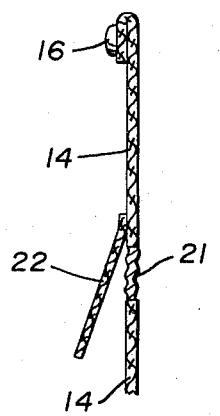
FIG. 3 is an enlarged cross section on line 3—3 of FIG. 2.

Those skilled in the art will observe that the add on enclosure disclosed and described in connection with FIGS. 1, 2 and 3 of the drawings hereinbefore can be applied with some slight modification to the camper constructions now commercially available wherein bunk or bed-like extensions fold outwardly of the ends or sides of the camper and provide areas therebeneath which can be enclosed by the add on enclosure of the present invention.

It will further be seen that while the preferred form of the invention is that hereinbefore described and illustrated it can alternately be formed of rigid or semi-rigid lightweight panels of suitable material attached to the camper or trailer in the same manner as the fabric device hereinbefore described.

Although but one embodiment of the present invention has been illustrated and described it will be apparent to those skilled in the art that various changes and modifications may be made therein without departing from the spirit of the invention.

Having thus described my invention, what I claim is:

1. An add on enclosure for a trailer having an outwardly extending portion normally overlying a part of a towing vehicle, said add on enclosure consisting of a U-shaped wall means detachably secured to and along the peripheral edge of the lateral sides and the ends of said outwardly extending portion of said trailer and being of a height arranged to extend downwardly from said outwardly extending portion of said trailer to the ground level therebelow so as to enclose the area beneath said outwardly extending portion, and access means in said wall defining means;

said wall means consists of a flexible waterproof sheet material disposed on substantially the same vertical planes as the vertical side and end walls of the outwardly extending portion of the trailer thereabove; said flexible waterproof sheet having at least one horizontal resilient section extending the length of an entire section of said wall means which permits the height of said section of said wall means to be resiliently increased, means for securing the lower edge of said wall means to the ground at spaced points along the lower peripheral edge of each of each of said lateral sides and ends; and wherein said flexible waterproof sheet is detachably secured by separable fasteners which are secured to the peripheral edge of said outwardly extending portion of said trailer and to the upper edge of said wall defining means and the separable fasteners are placed and arranged for mutual engagement.

2. The add on enclosure for a trailer set forth in claim 1 and wherein a floor portion is secured to the lower edges of said wall means and extends therebetween.

* * * * *